United States Patent
Hobgood et al.

(10) Patent No.: US 10,848,565 B1
(45) Date of Patent: Nov. 24, 2020

(54) SYSTEMS AND METHODS FOR DISTRIBUTED CONTROLS VIA EDGE DEVICES

(71) Applicant: Johnson Controls Technology Company, Auburn Hills, MI (US)

(72) Inventors: Hunter R. Hobgood, Franklin, WI (US); Homero L. Noboa, Waukesha, WI (US); Dinesh Trikha, Shorewood, WI (US); Camille M. Aucoin, Milwaukee, WI (US); Sudhanshu Dixit, Milwaukee, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 7 days.

(21) Appl. No.: 16/408,657

(22) Filed: May 10, 2019

(51) Int. Cl.
| | |
|---|---|
| *G05B 11/01* | (2006.01) |
| *H04L 29/08* | (2006.01) |
| *G05B 15/02* | (2006.01) |
| *F24F 11/54* | (2018.01) |
| *H04W 4/06* | (2009.01) |

(52) U.S. Cl.
CPC ............ *H04L 67/125* (2013.01); *F24F 11/54* (2018.01); *G05B 15/02* (2013.01); *H04L 67/10* (2013.01); *H04W 4/06* (2013.01)

(58) Field of Classification Search
CPC ............................................. G05B 2219/2214
USPC ......................................................... 700/20
See application file for complete search history.

(56) References Cited

U.S. PATENT DOCUMENTS

| | | | |
|---|---|---|---|
| 6,104,963 A * | 8/2000 | Cebasek ................ | G05B 15/02 700/17 |
| 9,746,199 B1 | 8/2017 | Drees et al. | |
| 10,698,399 B2 * | 6/2020 | Brownie ............ | G05B 23/0243 |
| 2010/0031177 A1 * | 2/2010 | Reed .................... | G05B 19/042 715/771 |
| 2011/0238816 A1 * | 9/2011 | Vohra .................. | H04L 41/0806 709/224 |
| 2013/0144451 A1 * | 6/2013 | Kumar .................... | G05B 13/02 700/291 |
| 2016/0018126 A1 * | 1/2016 | Kolk ........................ | F24F 11/30 700/278 |
| 2017/0300193 A1 * | 10/2017 | Ray ...................... | G06F 3/04847 |
| 2018/0187909 A1 | 7/2018 | Drees et al. | |
| 2018/0238577 A1 | 8/2018 | Drees et al. | |
| 2018/0239371 A1 | 8/2018 | Drees et al. | |
| 2020/0112453 A1 * | 4/2020 | Brown .............. | G06F 16/24573 |
| 2020/0200421 A1 * | 6/2020 | Aizu ........................ | E05F 15/79 |

* cited by examiner

*Primary Examiner* — Suresh Suryawanshi
(74) *Attorney, Agent, or Firm* — Foley & Lardner LLP

(57) ABSTRACT

Systems and methods for distributed controls via edge devices are provided. The system includes a coordinating device and a plurality of distributed controllers. The coordinating device is configured to determine a current state, assign tasks for performing control specified by a control application to the plurality of distributed controllers, and broadcast a plurality of parameters. The plurality of distributed controllers are configured to perform the control specified by the control application. Each distributed controller is configured to receive a respective task, perform a respective control operation, and control an edge device using a control signal generated from the control operation.

20 Claims, 10 Drawing Sheets

SYSTEMS AND METHODS FOR DISTRIBUTED CONTROLS VIA EDGE DEVICES

BACKGROUND

The present disclosure relates generally to a building automation system (BAS). The present disclosure relates more particularly to distributed controllers in a BAS.

A BAS is, in general, a system of devices configured to control, monitor, and manage equipment in or around a building or building area. A BAS can include, for example, a heating, ventilating, or air conditioning (HVAC) system, a security system, a lighting system, a fire alerting system, any other system that is capable of managing building functions or devices, or any combination thereof. A BAS can include various types of building equipment (e.g., chillers, fans, valves, dampers, etc.) that operate to control conditions within a building space.

BAS field devices such as actuators, valves, thermostats, and sensors, etc. are sometimes referred to as edge devices in a BAS network. The networking of the edge devices is typically via serial bus based on a BACnet protocol. The edge devices, however, do not communicate with each other. Rather, they communicate with higher level controllers, such as Field Equipment Controllers (FECs) and/or Network Automation Engines (NAEs). The higher level controllers are supervisory controllers of the edge devices and provide direct access and control of the edge devices.

SUMMARY

One implementation of the present disclosure is a system for distributed controls via edge devices. The system can include a coordinating device and a plurality of distributed controllers. The distributed controllers can be configured to perform control specified by a control application. The coordinating device can be configured to determine a current state associated with the control application based at least in part on one or more current operating modes. The coordinating device can be configured to assign a plurality of tasks for performing the control specified by the control application to the plurality of distributed controllers based at least in part on the determined current state. Each of the plurality of distributed controllers can be assigned a respective task of the plurality of tasks. The coordinating device can be configured to transmit a plurality of parameters associated with the plurality of tasks. A first distributed controller among the plurality of distributed controllers can be configured to receive a first task for performing the control specified by the control application assigned from the coordinating device, perform a first control operation corresponding to the first task using at least one or more of the plurality of parameters received from the coordinating device, and output a result of the first control operation.

In some embodiments, a second distributed controller among the plurality of distributed controllers can be configured to receive a second task for performing the control specified by the control application assigned from the coordinating device and receive the result of the first control operation from the first distributed controller. The second distributed controller can be configured to perform a second control operation corresponding to the second task using at least the result of the first operation from the first distributed controller and output a result of the second control operation.

In some embodiments, the result of the first control operation is a control signal generated from the first control operation, and the first distributed controller is configured to control a HAVC equipment using the generated control signal.

In some embodiments, the result of the first control operation is a control signal generated from the first control operation, and the first distributed controller is integrated with an actuator configured to use the control signal to control a valve, a damper, or an air handing unit.

In some embodiments, each of the distributed controllers is integrated with a respective edge device. In some embodiments, the respective edge device comprises at least one of an actuator, a valve, a thermostat, a sensor, a damper, or an air handling unit.

In some embodiments, the plurality of tasks for performing the control specified by the control application are assigned further based on the edge device integrated in each distributed controller.

In some embodiments, the first distributed controller is integrated with an actuator comprising a motor and a drive device.

In some embodiments, each of the plurality of distributed controllers is configured to perform a respective portion of the control specified by the control application.

In some embodiments, the plurality of distributed controllers are configured to communicate with each other wirelessly using one or more wireless protocols.

In some embodiments, the plurality of distributed controllers are configured to communicate with each other via wired connections.

In some embodiments, the one or more current operating modes comprise at least one of a heating mode, a cooling mode, an occupied mode, or an unoccupied mode.

Another implementation of the present disclosure is a system for distributed controls via edge devices. The system includes a first distributed controller comprising a first edge device, a first processor, and a first memory. The first edge device comprises at least one of an actuator, a valve, a thermostat, a sensor, a damper, or an air handling unit. The first memory is coupled to the first processor and stores computer-executable instructions, which when executed by the first processor, causing the first processor to generate a first control signal by performing a first control operation of a control application, control the first edge device to generate an output signal using the first control signal generated from the first control operation of the control application, and output the output signal generated by the first edge device. The system also includes a second distributed controller comprising a second edge device, a second processor, and a second memory. The second edge device comprises at least one of an actuator, a valve, a thermostat, a sensor, a damper, or an air handling unit. The second memory is coupled to the second processor and stores computer-executable instructions, which when executed by the second processor, causing the second processor to receive the output signal from the first distributed controller, generate a second control signal by performing a second control operation of the control application using at least the output signal from the first distributed controller, and control the second edge device using the second control signal generated from the second control operation of the control application.

In some embodiments, the first edge device, the first processor, and the first memory are integrated within a first housing of the first distributed controller, and the second edge device, the second processor, and the second memory are integrated within a second housing of the second distributed controller.

In some embodiments, the second distributed controller receives the output signal from the first distributed controller wirelessly over a wireless protocol.

In some embodiments, the second distributed controller receives the output signal from the first distributed controller via a wired connection.

Another implementation of the present disclosure is a method for distributed controls via edge devices. The method includes determining, by a coordinating device comprising a processor and a memory, a current state associated with a control application based at least in part on one or more current operating modes. The method includes assigning, by the coordinating device, a plurality of tasks for performing control specified by the control application to a plurality of distributed controllers based at least in part on the determined current state. Each of the plurality of distributed controllers is assigned a respective task of the plurality of tasks. The method includes broadcasting, by the coordinating device, a plurality of parameters associated with the plurality of tasks. Each of the plurality of distributed controllers is configured to perform a respective portion of the control specified by the control application using one or more of the plurality of parameters broadcasted from the coordinating device.

In some embodiments, the method includes receiving, by a distributed controller among the plurality of distributed controllers, a first task for performing the control specified by the control application assigned from the coordinating device. The method includes performing, by the distributed controller, a first control operation corresponding to the first task using at least one or more of the plurality of parameters received from the coordinating device. The method includes controlling, by the distributed controller, an edge device using a control signal generated from the first control operation.

In some embodiments, the plurality of distributed controllers communicate with each other via at least one of wired or wireless connections.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing.

DETAILED DESCRIPTION

Following below are more detailed descriptions of various concepts related to, and implementations of systems, methods, and apparatuses for distributed controls via edge devices. Before turning to the more detailed descriptions and figures, which illustrate the exemplary implementations in detail, it should be understood that the application is not limited to the details or methodology set forth in the descriptions or illustrated in the figures. It should also be understood that the terminology is for the purpose of description only and should not be regarded as limiting.

Building Automation System and HVAC System

Figure 1:
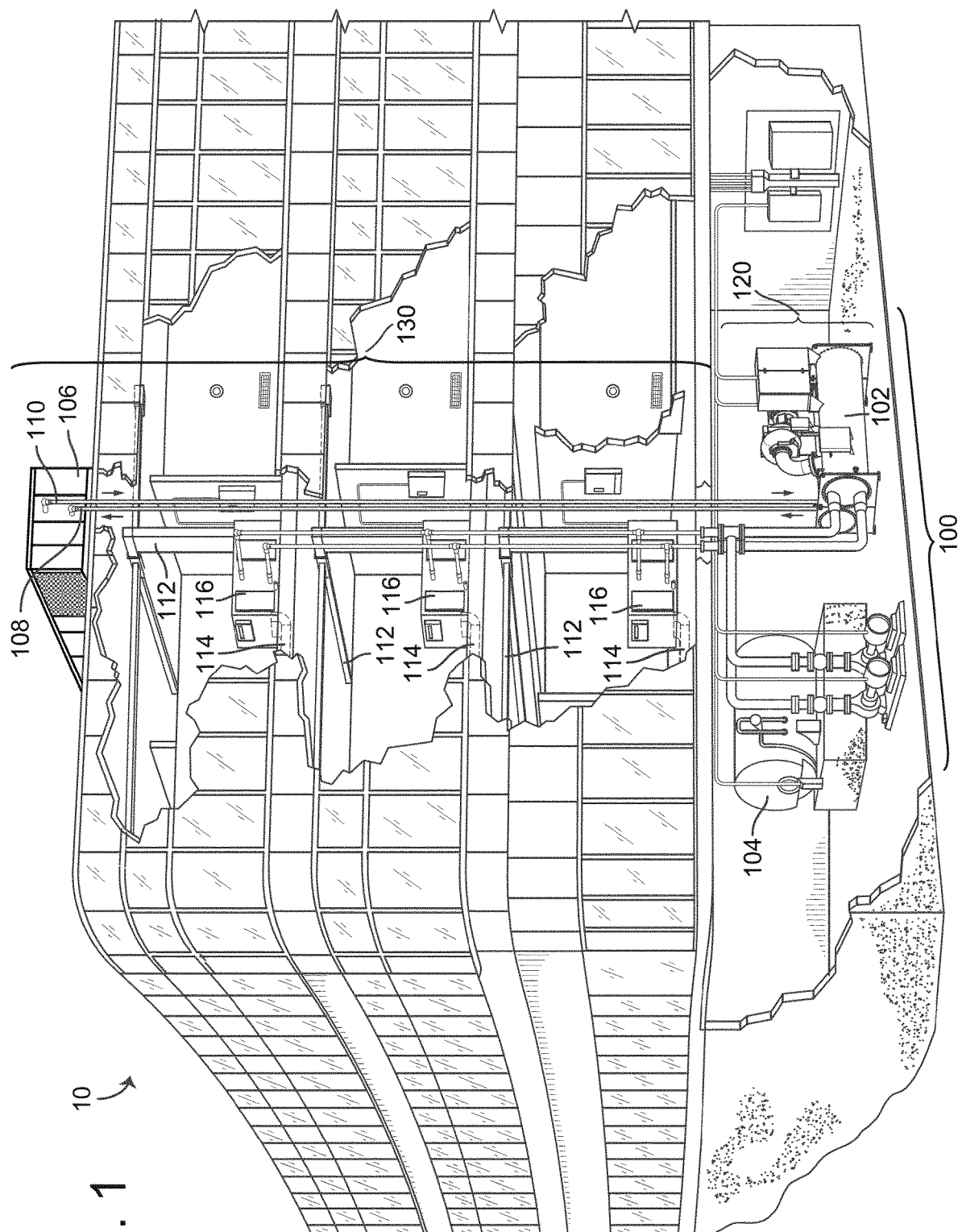
FIG. 1 is a drawing of a building equipped with a BAS which includes a HVAC system, according to an exemplary embodiment.
Figure 2:
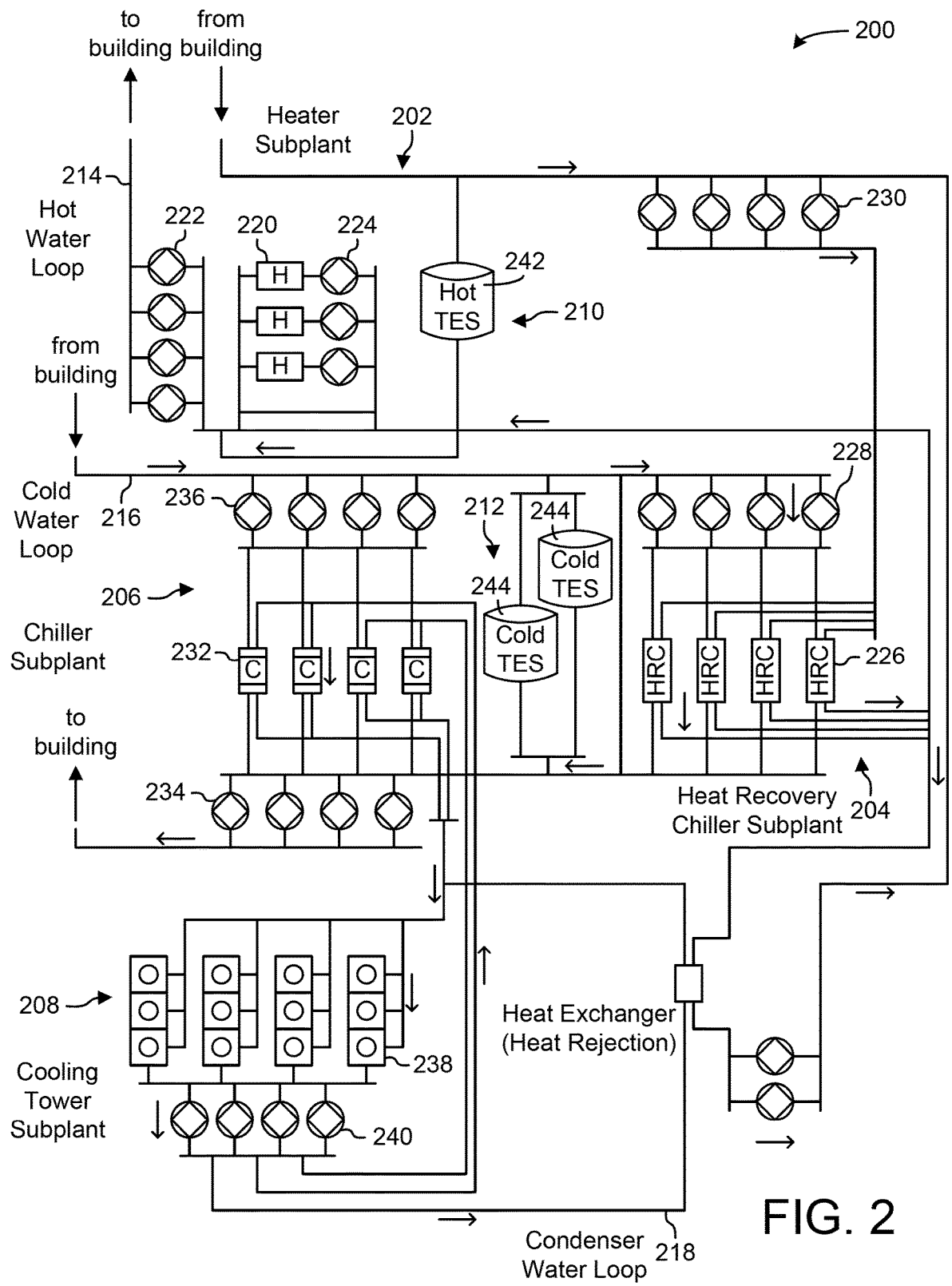
FIG. 2 is a block diagram of a waterside system which can be used to serve the building of FIG. 1, according to an exemplary embodiment.
Figure 3:
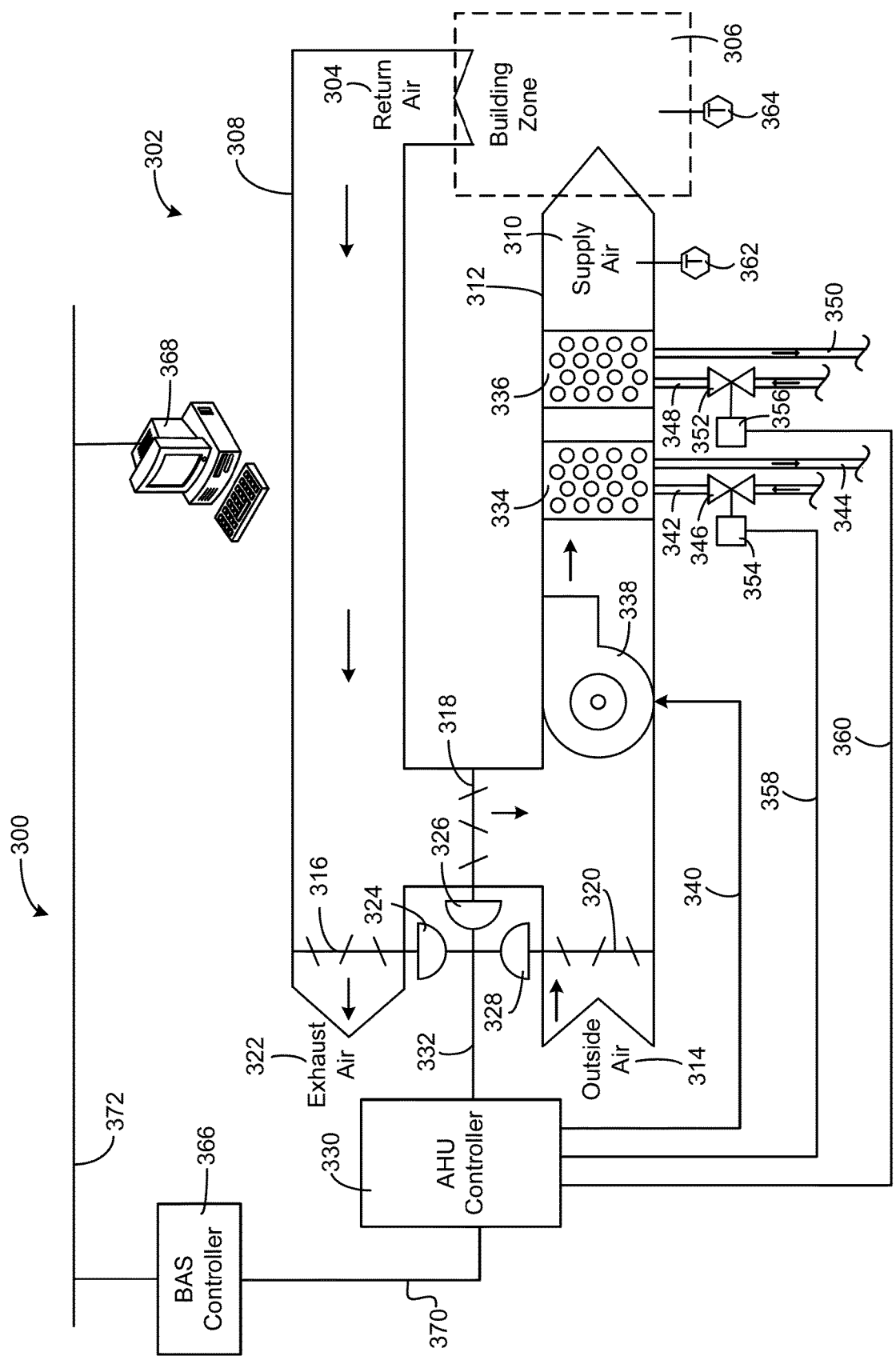
FIG. 3 is a block diagram of an airside system which can be used to serve the building of FIG. 1, according to an exemplary embodiment.
Figure 4:
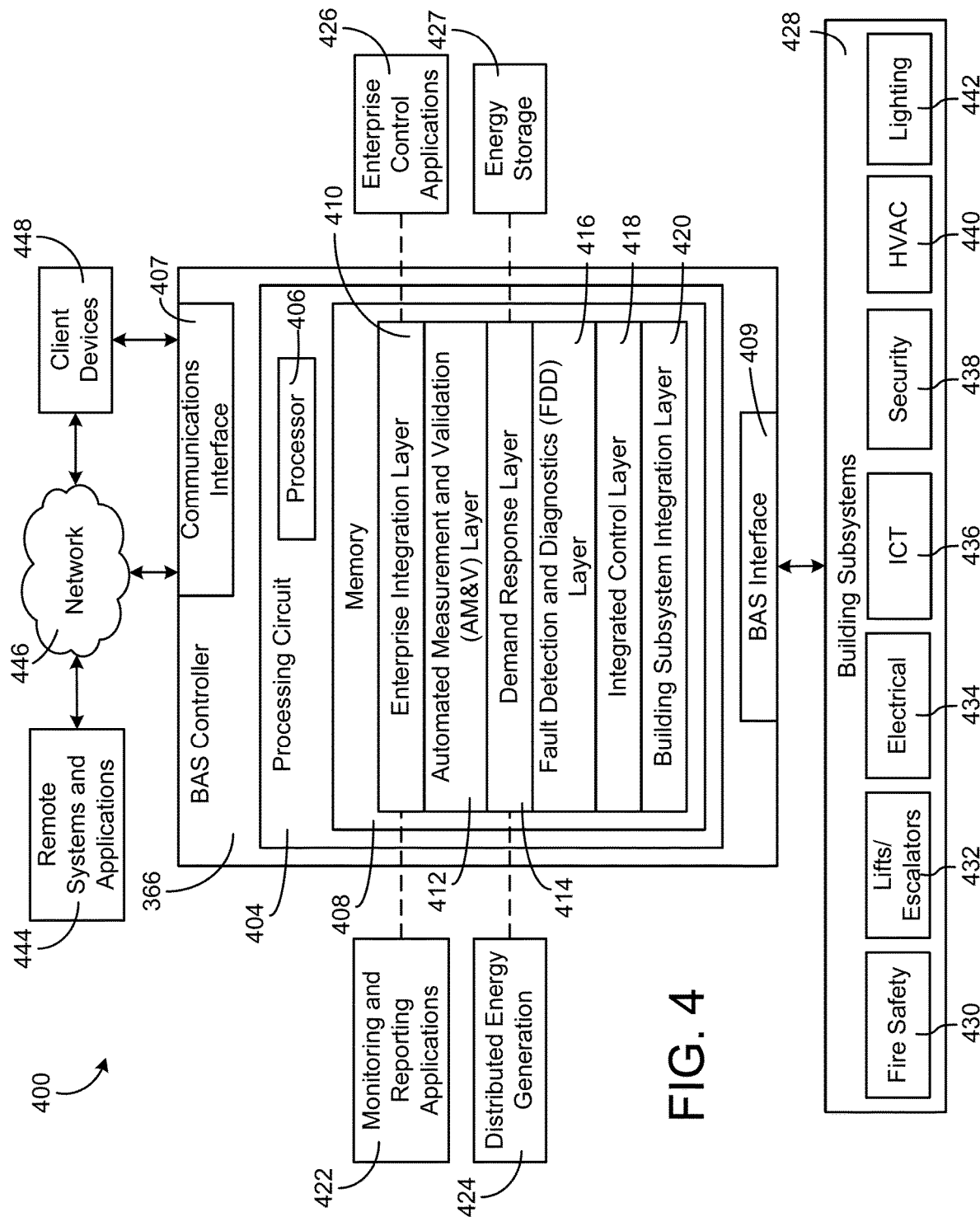
FIG. 4 is a block diagram of a BAS that can be implemented in the building of FIG. 1, according to an exemplary embodiment.

Referring now to FIGS. 1-4, an exemplary building automation system (BAS) and HVAC system in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BAS that can be implemented in the building 10.

Referring particularly to FIG. 1, a perspective view of a building 10 is shown. Building 10 is served by a BAS. A BAS is, in general, a system of devices configured to control, monitor, and manage equipment in or around a building or building area. A BAS can include, for example, a HVAC system, a security system, a lighting system, a fire alerting system, any other system that is capable of managing building functions or devices, or any combination thereof.

The BAS that serves building 10 includes an HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Referring now to FIG. 2, a block diagram of a waterside system 200 is shown, according to an exemplary embodiment. In various embodiments, waterside system 200 may supplement or replace waterside system 120 in HVAC system 100 or can be implemented separate from HVAC system 100. When implemented in HVAC system 100, waterside system 200 may include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve the thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 may include more, fewer, or different types of devices and/or subplants based on the particular configuration of waterside system 200 and the types of loads served by waterside system 200.

Referring now to FIG. 3, a block diagram of an airside system 300 is shown, according to an exemplary embodiment. In various embodiments, airside system 300 may supplement or replace airside system 130 in HVAC system 100 or can be implemented separate from HVAC system 100. When implemented in HVAC system 100, airside system 300 may include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust air damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals may include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BAS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BAS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 may control the temperature of supply air 310 and/or building zone 306 by activating or deactivating coils 334-336, adjusting a speed of fan 338, or a combination of both.

Still referring to FIG. 3, airside system 300 is shown to include a building automation system (BAS) controller 366 and a client device 368. BAS controller 366 may include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BAS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BAS controller 366 can be separate (as shown in FIG. 3) or integrated. In an integrated implementation, AHU controller 330 can be a software module configured for execution by a processor of BAS controller 366.

In some embodiments, AHU controller 330 receives information from BAS controller 366 (e.g., commands, setpoints, operating boundaries, etc.) and provides information to BAS controller 366 (e.g., temperature measurements, valve or actuator positions, operating statuses, diagnostics, etc.). For example, AHU controller 330 may provide BAS controller 366 with temperature measurements from temperature sensors 362-364, equipment on/off states, equipment operating capacities, and/or any other information that can be used by BAS controller 366 to monitor or control a variable state or condition within building zone 306.

Client device 368 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BAS controller 366 and/or AHU controller 330 via communications link 372.

Referring now to FIG. 4, a block diagram of a building automation system (BAS) 400 is shown, according to an exemplary embodiment. BAS 400 can be implemented in building 10 to automatically monitor and control various building functions. BAS 400 is shown to include BAS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 may include any number of devices, controllers, and connections for completing its individual functions and control activities. HVAC subsystem 440 may include many of the same components as HVAC system 100, as described with reference to FIGS. 1-3. For example, HVAC subsystem 440 may include any number of chillers, heaters, handling units, economizers, field controllers, supervisory controllers, actuators, temperature sensors, and/or other devices for controlling the temperature, humidity, airflow, or other variable conditions within building 10. Lighting subsystem 442 may include any number of light fixtures, ballasts, lighting sensors, dimmers, or other devices configured to controllably adjust the amount of light provided to a building space. Security subsystem 438 may include occupancy sensors, video surveillance cameras, digital video recorders, video processing servers, intrusion detection devices, access control devices and servers, or other security-related devices.

Still referring to FIG. 4, BAS controller 366 is shown to include a communications interface 407 and a BAS interface 409. Interface 407 may facilitate communications between BAS controller 366 and external applications (e.g., monitoring and reporting applications 422, enterprise control applications 426, remote systems and applications 444, applications residing on client devices 448, etc.) for allowing user control, monitoring, and adjustment to BAS controller 366 and/or subsystems 428. Interface 407 may also facilitate communications between BAS controller 366 and client devices 448. BAS interface 409 may facilitate communications between BAS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a WiFi transceiver for communicating via a wireless communications network. In another example, one or both of interfaces 407, 409 may include cellular or mobile phone communications transceivers. In some embodiments, communications interface 407 is a power line communications interface and BAS interface 409 is an Ethernet interface. In other embodiments, both communications interface 407 and BAS interface 409 are Ethernet interfaces or are the same Ethernet interface.

Still referring to FIG. 4, BAS controller 366 is shown to include a processing circuit 404 including a processor 406 and memory 408. Processing circuit 404 can be communicably connected to BAS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 may include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BAS controller 366 is implemented within a single computer (e.g., one server, one housing, etc.). In various other embodiments, BAS controller 366 can be distributed across multiple servers or computers (e.g., that can exist in distributed locations). Further, while FIG. 4 shows applications 422 and 426 as existing outside of BAS controller 366, in some embodiments, applications 422 and 426 can be hosted within BAS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BAS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BAS controller 366. In yet other embodiments, enterprise control applications 426 can work with layers 410-420 to optimize building performance (e.g., efficiency, energy use, comfort, or safety) based on inputs received at interface 407 and/or interface 409.

Building subsystem integration layer 420 can be configured to manage communications between BAS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfying the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BAS controller 366 (e.g., building subsystem integration layer 420, integrated control layer 418, etc.). The inputs received from other layers may include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models may include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BAS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults may include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BAS 400 and the various components thereof. The data generated by building subsystems 428 may include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Distributed Controls Via Edge Devices

With the rapid development in computer and communications technologies, edge devices become more capable. However, they may still not possess all the hardware resources to run the larger control applications. For example, shortcomings of the edge devices may include reduced Input/Output (I/O), RAM, ROM, processor speed, etc. In some embodiments, all I/Os are funneled into a single higher level controller (e.g., a NAE or FEC) and the controller outputs analog signals to the edge devices. In some embodiments, an input/output module (TOM) may be needed depending on the number of I/Os necessary for the control logic as well as the specific NAE or FEC chosen for the application.

These additional hardware pieces/products add to the overall cost and time lost due to the number of different components per control application. Such added cost and time lost include those in procurement, supply chain, and manufacturing, purchasing, installation, troubleshooting, design and engineering of fixes or new features. Furthermore, the installation complexity and cost may also be increased due to the location of the higher level controllers (e.g., NAEs or FECs) relevant to the I/O and the edge device. For example, if the distance between the higher level controller and the edge device is outside of the same space (e.g., same floor, same unit), additional wiring is needed.

Systems and methods of the present disclosure can solve the above discussed problems by providing distributed controllers as described herein. In some embodiments, a single distributed controller can replace a single edge device and a higher level controller (e.g., a FEC or NAE) at a minimum. The distributed controller can be configured to perform a portion or a part of the control of (e.g., specified by, defined by) a control application and can communicate with other distributed controllers to accomplish the control of the control application together. In some embodiments, having a distributed control logic allows the devices to share all input data, sub-output data (e.g., outputs from functional blocks that are inputs to other functional blocks as opposed to the final hardware output), and output data, thereby fulfilling the full control logic.

In some embodiments, the distributed controller can also eliminate the need for an IOM in some installations. In some embodiments, the distributed controller can decide which portion of the control logic it performs based on the specifics of the I/O that is connected to it (e.g., count as well as what particular sensors and controls are connected). In some embodiments, users can input configuration data (e.g., I/O, network settings, control settings, account settings) via Hypertext Markup Language (HTML) or mobile applications. The distributed controller can drive all outputs that are connected to it and can communicate all data with all other distributed controllers responsible for performing the control of the application. In some embodiments, all communications can be via Hypertext Transfer Protocol Secure (HTTPS). In some embodiments, the distributed controller can be one version of hardware (e.g., one manufactured product) that is loaded (either in the factory or on site) with an appropriate control application. In some embodiments, the control application can be the same for all distributed controllers configured to accomplish the application. For example, a single distributed controller (e.g., an instance of the distributed controller, a piece of hardware) can be loaded with a single piece of control logic or application. Based on the configuration of the I/O, this single distributed controller can determine which portion of the control logic or application is to be executed and what points of data are to be made available to another single distributed controller (e.g., another instance of the same distributed controller, another piece of hardware), in some embodiments. As another example, a single distributed controller (e.g., an instance of the distributed controller, a piece of hardware) can be installed, and then based on the configuration of the I/O, a user or the single distributed controller itself can download (e.g., manually or automatically) the appropriate control application (or sub-application) that the particular distributed controller is supposed to (or configured to, planned to) run or execute.

The distributed controllers as described herein can have all the benefits of the prior method with additional benefits, such as reduced stockkeeping unit (SKU)'s, stream lined factory procedures because only one product is manufactured, thus simplifying products purchased by the end user, and hardware installed and configured by the technician. For example, each of the pieces in the supply chain and lifecycle of the product can result in cost savings. The overall cost of the hardware can be reduced and the larger processor in the higher level controllers (e.g., FECs, NAEs) can be replaced by many smaller processors in the distributed controllers/edge devices.

Figure 5:
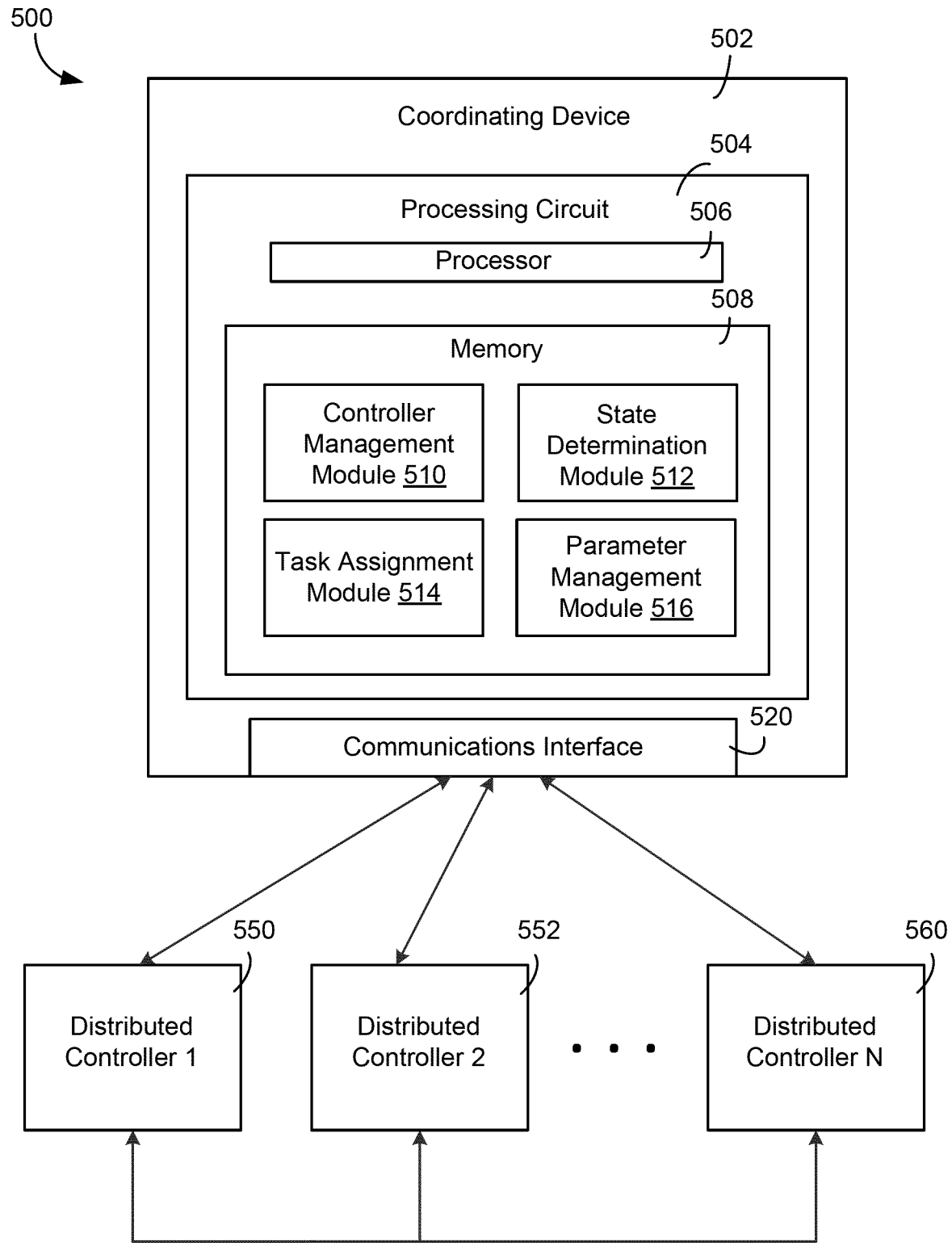
FIG. 5 is a block diagram of a system for distributed controls via edge devices, according to an exemplary embodiment.

Referring now to FIG. 5, a block diagram of a system 500 for distributed controls via edge devices is shown, according to an exemplary embodiment. System 500 may be implemented in building 10 to automatically control various building functions using distributed controllers. System 500 is shown to include a coordinating device 502 and a plurality of distributed controllers (1-N) 550, 552, . . . , 560, where N is an integer. In some embodiments, coordinating device 502 can be configured to coordinate tasks among a group of distributed controllers (e.g., some or all of distributed controllers 1-N) to perform the control specified by a control application. Distributed controllers 550-560 can communicate with each other and are described herein below in greater detail in relation to FIG. 6.

Coordinating device 502 is shown to include a processing circuit 504 and a communications interface 520. The processing circuit 504 can include a processor 506 and a memory 508. In some embodiments, the processor 506 can be implemented as a special purpose processor, a general purpose processor, an application specific integrated circuit (ASIC), one or more field programmable gate arrays (FPGAs), a group of processing components, or other suitable electronic processing components. The processor 506 may be configured to execute computer code or computer-executable instructions stored in memory or received from other non-transitory computer readable media (e.g., CDROM, network storage, a remote server, etc.).

Memory 508 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 508 can be or include volatile memory or non-volatile memory. Memory 508 can include database components, object code components, script components, or any other type of information structure for supporting the various activities and information structures described in the present application. Memory 508 may be communicably connected to the processor via the processing circuit and may include computer code for executing (e.g., by the processor) one or more processes described herein. In some embodiments, the memory 508 can include at least a controller management module 510, a state determination module 512, a task assignment module 514, a parameter management module 516. In some embodiments, modules 510-516 stored in a non-transitory computer readable medium (e.g., memory 508) can be executed by the processor 506 to perform operations as described herein.

Communications interface 520 may include wired or wireless interfaces (e.g., jacks, antennas, transmitters, receivers, transceivers, wire terminals, etc.) for conducting data communications with various systems, devices, or networks. For example, the communications interface 520 may include an Ethernet card and port for sending and receiving data via an Ethernet-based communications network and/or a Wi-Fi transceiver for communicating via a wireless communications network. The communications interface 520 may be configured to communicate via local area networks or wide area networks (e.g., the Internet, a building WAN, etc.) and may use a variety of communications protocols (e.g., BACnet, IP, LON, etc.). The communications interface 520 may include a network interface configured to facilitate electronic data communications with distributed controllers 550-560 and various devices and equipment of the BAS.

Figure 6:
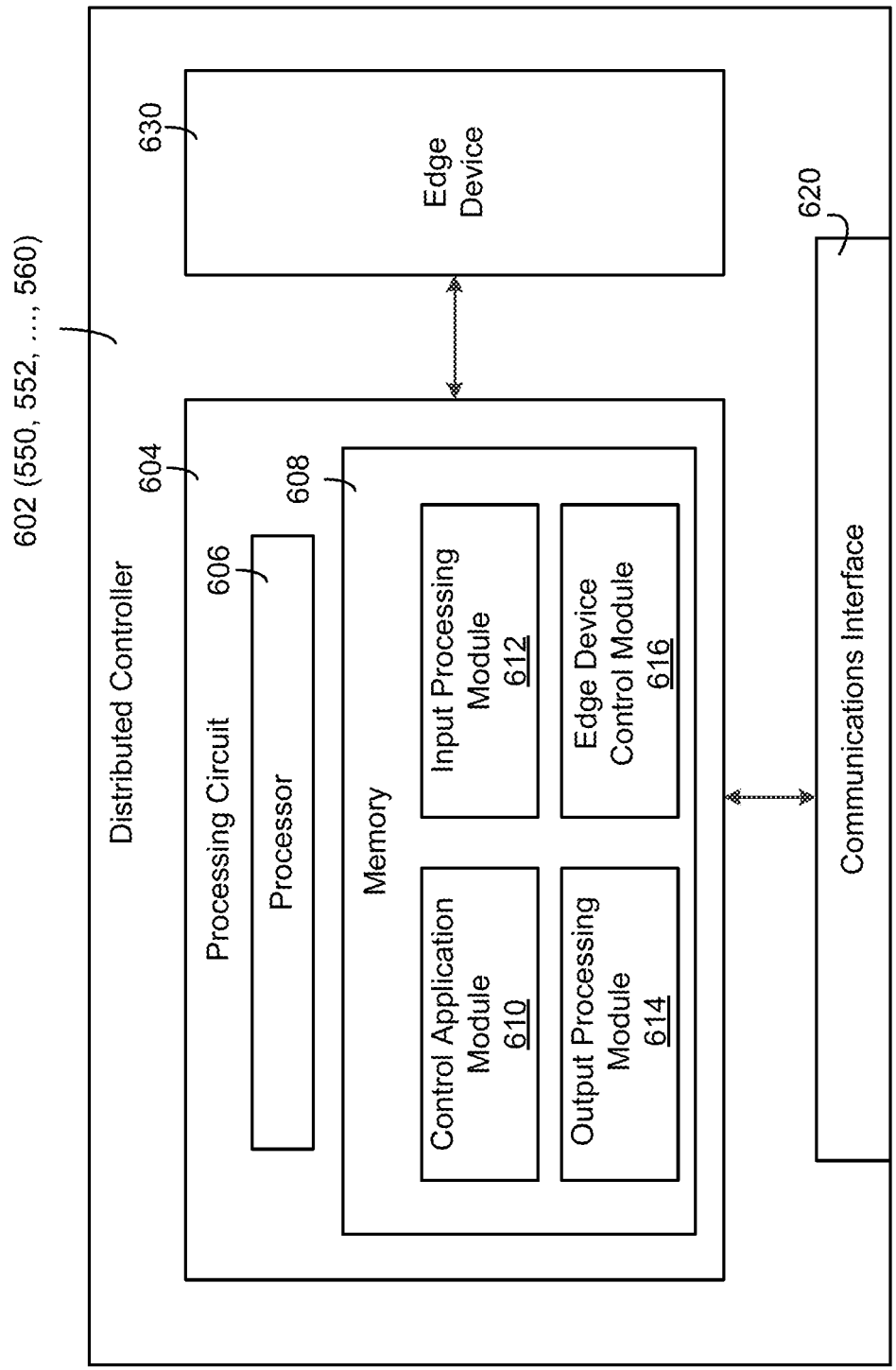
FIG. 6 is a block diagram illustrating a distributed controller for distributed controls via edge devices, according to an exemplary embodiment.

Referring now to FIG. 6, a block diagram illustrating distributed controller 602 in greater detail is shown, according to an exemplary embodiment. Distributed controller 602 represents the plurality of distributed controllers (1-N) 550-560 in FIG. 5. Distributed controller 602 is shown to include a processing circuit 604, a communications interface 620, and an edge device 630. In some embodiments, the processing circuit 604, the communications interface 620, and the edge device 630 are integrated within one device (e.g., one device chassis or housing).

Communications interface 620 may include wired or wireless interfaces (e.g., jacks, antennas, transmitters, receivers, transceivers, wire terminals, etc.) for conducting data communications with various systems, devices, or networks. For example, the communications interface 620 may include an Ethernet card and port for sending and receiving data via an Ethernet-based communications network and/or a Wi-Fi transceiver for communicating via a wireless communications network. The communications interface 620 may be configured to communicate via local area networks or wide area networks (e.g., the Internet, a building WAN, etc.) and may use a variety of communications protocols (e.g., BACnet, IP, LON, etc.). The communications interface 620 may include a network interface configured to facilitate electronic data communications with the coordinating device 502, other distributed controllers, and BAS devices as described in FIGS. 1-4.

The processing circuit 604 is shown to include a processor 606 and a memory 608. In some embodiments, the processor 606 can be implemented as a special purpose processor, a general purpose processor, an application specific integrated circuit (ASIC), one or more field programmable gate arrays (FPGAs), a group of processing components, or other suitable electronic processing components. The processor 606 may be configured to execute computer code or computer-executable instructions stored in memory or received from other non-transitory computer readable media (e.g., CDROM, network storage, a remote server, etc.).

Memory 608 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 608 can be or include volatile memory or non-volatile memory. Memory 608 can include database components, object code components, script components, or any other type of information structure for supporting the various activities and information structures described in the present application. Memory 608 may be communicably connected to the processor via the processing circuit and may include computer code for executing (e.g., by the processor) one or more processes described herein. In some embodiments, the memory 608 can include a control application module 610, an input processing module 612, an output processing module 614, and an edge device control module 616. In some embodiments, modules 610-616 stored in a non-transitory computer readable medium (e.g., memory 608) can be executed by the processor 606 to perform operations as described herein.

Figure 7:
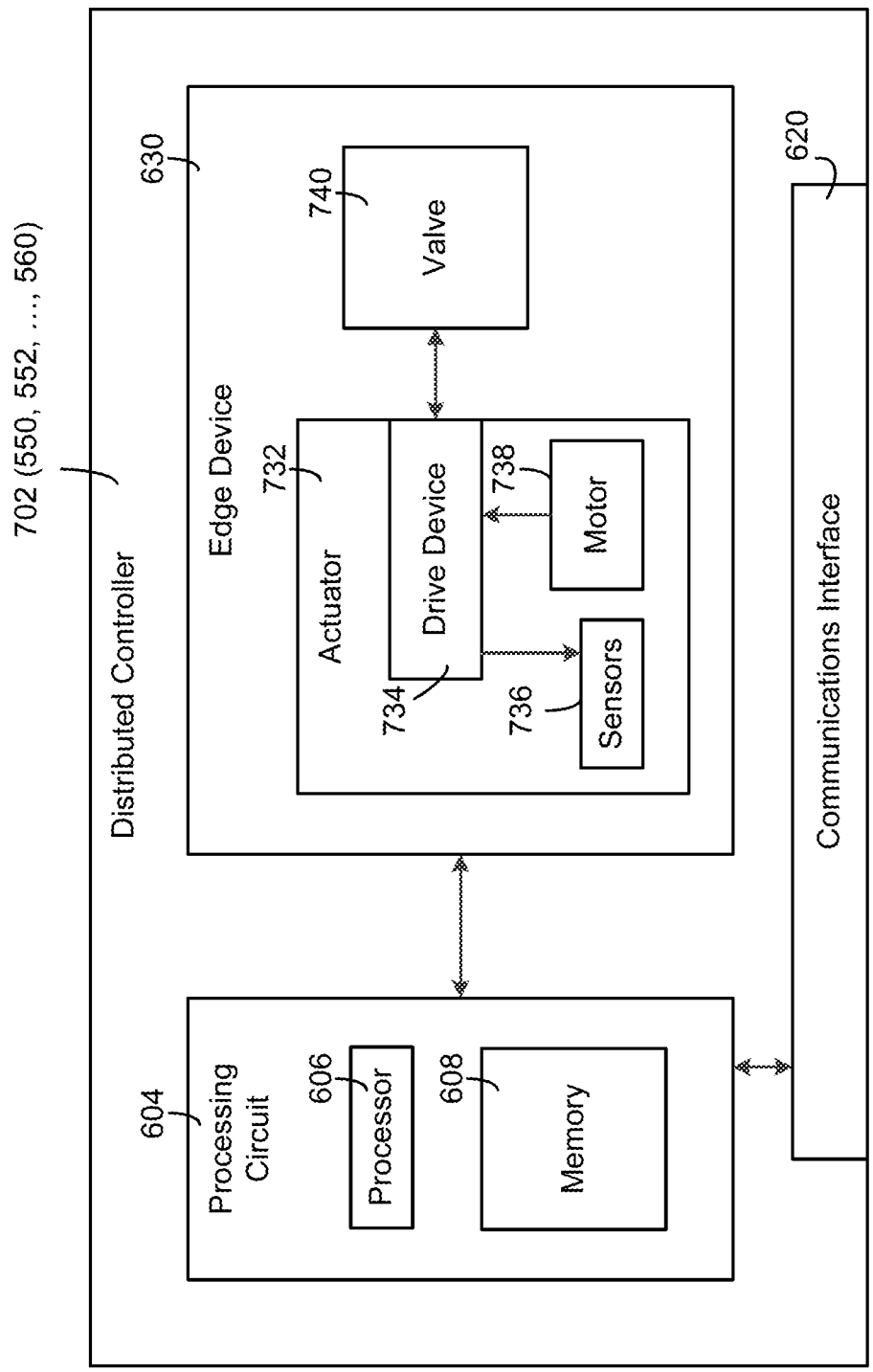
FIG. 7 is a block diagram illustrating a distributed controller with an example edge device in greater detail, according to an exemplary embodiment.
Figure 8:
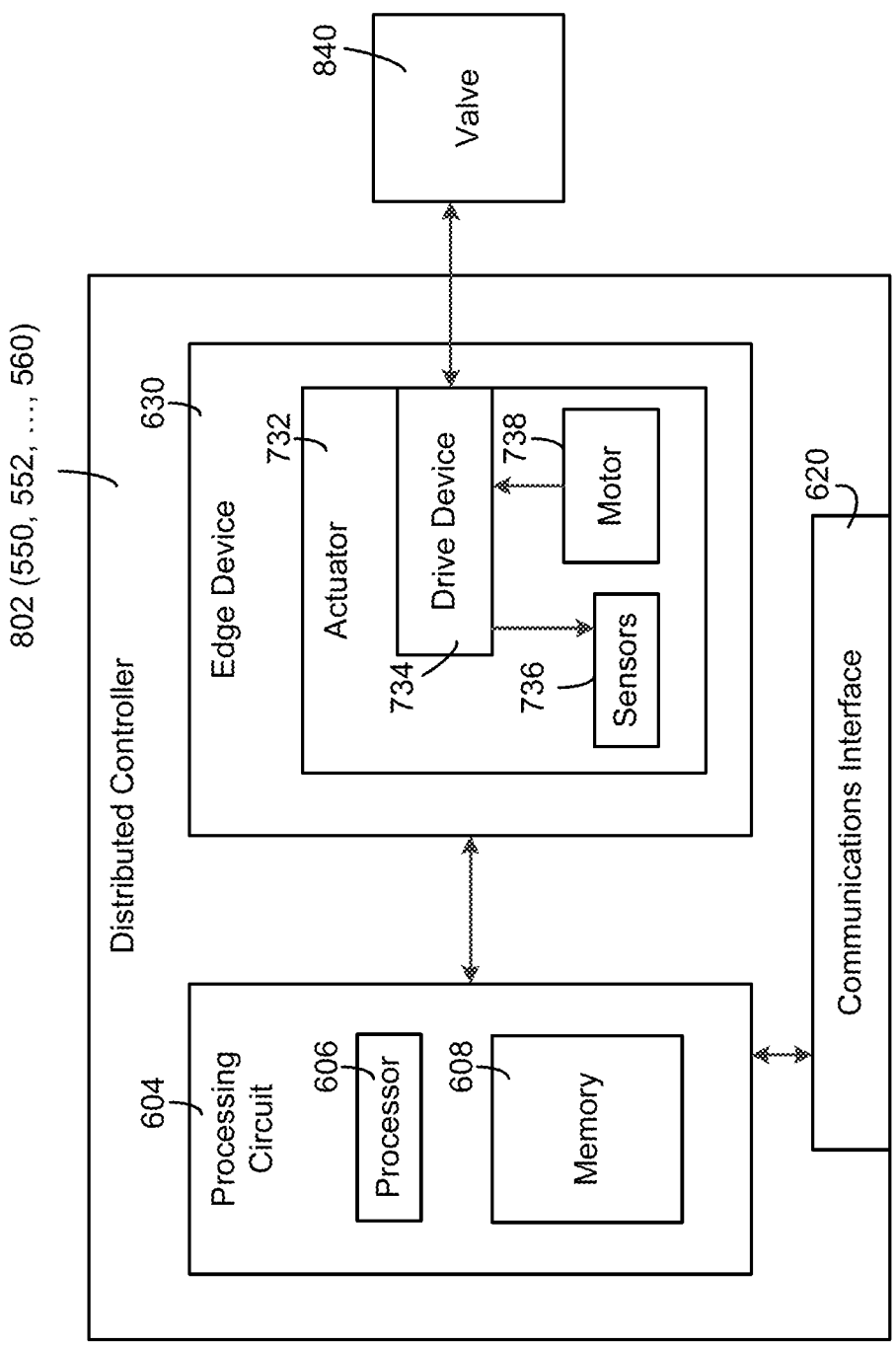
FIG. 8 is a block diagram illustrating a distributed controller with an example edge device in greater detail, according to an exemplary embodiment.

The edge device 630 can be a BAS field device such as an actuator, valve, thermostat, sensor, damper, AHU, etc. In some embodiments, the edge device 630 may include more than one BAS device. For example, the edge device 630 may include an actuator and a valve that is operated by the actuator. In other embodiments, the edge device 630 may include a BAS device that operates another BAS device which is outside of the distributed controller. FIGS. 7 and 8 illustrate distributed controllers with example edge devices in greater detail.

Referring now to FIG. 7, a block diagram illustrating a distributed controller 702 with an example edge device 630 in greater detail is shown, according to an exemplary embodiment. Distributed controller 702 is similar to distributed controller 602 in FIG. 6 and represents the plurality of distributed controllers (1-N) 550-560 in FIG. 5. Distributed controller 702 is shown to include a processing circuit 604 comprising a processor 606 and a memory 608, a communications interface 620, and an edge device 630. Processing circuit 604, processor 606, memory 608, and communications interface 620 of distributed controller 702 are similar or same to the processing circuit 604, processor 606, memory 608, and communications interface 620 of distributed controller 602, and are not described here again. The example edge device 630 in FIG. 7 is shown to include an actuator 732 and a valve 740 that are both integrated within the same device as the processing circuit 604 and the communications interface 620. In some embodiments, the actuator 732 can include a drive device 734, a motor 738 and sensors 736. In some embodiments, the motor 738 can receive a control signal from the processing circuit 604 and can drive the drive device 734 to control the valve 740. The sensors 736 can measure the rotational positions and other parameters of the motor 738 and/or drive device 734 and can send a feedback signal to the processing circuit 604.

FIG. 8 shows a distributed controller 802 which is similar to the distributed controller 702 except that the valve 840 is not part of the edge device 630 of the distributed controller 802. The processing circuit 604, the processor 606, the memory 608, the edge device 630, the actuator 732, the drive device 734, the sensors 736, and the motor 738 in FIG. 8 are similar or same as those in FIG. 7 and are not described here again. In FIG. 8, unlike the valve 740 which is integrated within the distributed controller 702 in FIG. 7, the valve 840 is a separate device from the distributed controller 802. In some embodiments, the motor 738 drives the drive device 734 to control the valve 840 via wired (e.g., Ethernet) or wireless connections (e.g., Wi-Fi, Bluetooth, ZigBee, NFC, etc.). While FIGS. 7 and 8 show actuator 732 and/or valve 740 as examples of edge device 630, it should be understood that the edge device 630 can be other BAS devices (e.g., thermostat, sensor, damper, AHU, etc.) and can contain different number of BAS devices. Furthermore, the actuator 732 and valve 740 are depicted in a simplified and high level fashion for the purpose of illustration and should not be regarded as limiting.

Referring now to FIGS. 1-8 together, in some embodiments, a plurality of distributed controllers can be configured to perform control specified or defined by a control application. For example, distributed controllers 550-560 can be configured to work together to perform control operations of a single control application. A control application can be any application that is executed by one or more controllers to perform control operations in a BAS, for example, as described in relation to FIGS. 1-4. For instance, a control application may control the temperature and humidity of one or more spaces in building 10. Another example control application may control the lighting of one or more spaces of building 10. A third example control application may control the security system of building 10. In some embodiments, instead of a central controller performing the control of (specified by, defined by) a control application, a plurality of distributed controllers (e.g., distributed controllers 550-560) each is configured to perform part or portion of the control of the control application.

In some embodiments, the coordinating device 502 can be configured to determine a current state associated with the control application based at least in part on one or more current operating modes. For example, the state determination module 512 can be configured to determine a current state based on one or more current operating modes associated with a control application. For example, for a control application that controls temperature, the operating modes may include a heating mode, a cooling mode, an occupied mode, and/or an unoccupied mode. In some embodiments, operating modes can be based on inputs from users. For example, a user can select the heating mode or cooling mode on a thermostat, and the coordinating device 502 can receive or obtain the selection via wired or wireless connection or means, in some embodiments. In some embodiments, operating modes can be obtained based on sensor readings. For example, a sensor in a space can sense whether the space is occupied by people. If the sensor senses people in the space, the sensor can send (or otherwise obtained by the coordinating device 502) an indication of occupied mode to the coordinating device 502. Conversely, if the sensor does not sense people in the space, the sensor can send (or otherwise obtained by the coordinating device 502) an indication of unoccupied mode to the coordinating device 502. The coordinating device 502 can determine the current state based on the operating modes. For example, if the current operating modes are cooling and occupied, the coordinating device 502 can determine that the current state is occupied cooling.

In some embodiments, the coordinating device 502 can be configured to assign a plurality of tasks for performing the control specified by the control application to the plurality of distributed controllers based on the determined current state. For example, the task assignment module 514 can be configured to assign tasks to the distributed controllers 550-560 for performing the control of the control application. Each of the plurality of distributed controllers can be assigned a respective task of the plurality of tasks. In some embodiments, the coordinating device 502 can maintain information of the distributed controllers in the system 500. For example, the controller management module 510 can maintain the information of the distributed controllers 550-560. In some embodiments, information of each distributed controller maintained by the controller management module 510 can include information of the control application loaded on each distributed controller, the edge device integrated within each distributed controller, the location of each distributed controller, and/or the Internet Protocol (IP) address of each distributed controller, etc. In some embodiments, the task assignment module 514 can determine which task to assign to which distributed controller among a plurality of distributed controllers that are loaded with the same control application based on the current state. For example, if the current state is a cooling state, the task assignment module 514 assigns the tasks of performing the cooling operation to the distributed controllers. In some embodiments, the tasks are assigned based on the edge devices integrated in the distributed controllers. For example, if the edge device integrated in a first distributed controller is an actuator for dampers, the task assignment module 514 assigns the task of controlling the dampers to the first distributed controller. Similarly, if the edge device integrated in a second distributed controller is an actuator for an AHU, the task assignment module 514 assigns the task of controlling the AHU to the second distributed controller.

In some embodiments, the coordinating device 502 can be configured to transmit a plurality of parameters associated with the plurality of tasks to the distributed controllers. For example, the parameter management module 516 can transmit parameters associated with the plurality of tasks to the distributed controllers 550-560 via the communications interface 520. In some embodiments, the parameter management module 516 can maintain a respective list of parameters for performing the control of each control application associated with the BAS. For example, for a temperature control application, the list of parameters can include one or more setpoints for each state, such as a temperature setpoint and a humidity setpoint for the occupied cooling state, a temperature setpoint and a humidity setpoint for the unoccupied cooling state, a temperature setpoint and a humidity setpoint for the occupied heating state, and a temperature setpoint and a humidity setpoint for the unoccupied heating state, etc. The values of the parameters can be set by users and/or can be set by the system. For example, a user may set the temperature setpoint for the occupied cooling state to be 70° F. and the temperature setpoint for the occupied heating state to be 75° F. For instance, the system may default/reset the temperature setpoint for the unoccupied cooling state to be 85° F. and the temperature setpoint for the unoccupied heating state to be 60° F.

In some embodiments, the plurality of parameters associated with the plurality of tasks can be transmitted by the coordinating device 502 via the communications interface 520 using different methods. For example, the coordinating device 502 can transmit the parameters by multicast or broadcast. The distributed controllers can receive the parameters and can determine which parameters to use based on the tasks assigned. In some embodiments, each of the plurality of distributed controllers performs part or portion of the control of the control application based on the tasks assigned using the parameters received.

In some embodiments, a first distributed controller among the plurality of distributed controllers can be configured to receive or obtain a first task for performing the control specified by the control application assigned from the coordinating device. For example, the input processing module 612 of the distributed controller 550 can receive the first task via the communications interface 620. In some embodiments, the first task can be in the form of a command encapsulated in an IP packet, and the coordinating device 502 can transmit the IP packet to the first distributed controllers based on the IP address of the first distributed controller. In some embodiments, the input processing module 612 can process the command associated with the first task. For example, the input processing module 612 can determine that the command is for performing a first control operation of the control application maintained by the control application module 610. In some embodiments, the control application module 610 can store information of the control application and can identify the portion of the control application for the processor 606 to execute.

In some embodiments, the first distributed controller 550 can be configured to perform a first control operation of the control application corresponding to the first task using at least one or more of the plurality of parameters transmitted or broadcasted by the coordinating device 502. In some embodiments, the input processing module 612 can receive the parameters transmitted via multicast or broadcasted by the coordinating device 502 through the communications interface 520. In some embodiments, the input processing module 612 can identify the relevant parameters for performing the first tasks among the plurality of parameters received and send those parameters to the edge device control module 616. The edge device control module 616 can perform the first control operation of the control application corresponding to the first task using the identified parameters. For example, if the first operation is to control the edge device 630 which is or includes an actuator for dampers, the edge device control module 616 can compare the temperature setpoint parameter received from the coordinating device 502 with the current temperature measured by a sensor (can be located within the edge device 630 or the distributed controller, or outside of the distributed controller). Based on the comparison, the edge device control module 616 can generate a control signal for controlling the actuator included in the edge device 630 to adjust the damper positions to bring the current temperature to the temperature setpoint. In some embodiments, the edge device control module 616 can be configured to perform the first control operation using control techniques such as proportional-integral (PI) control, proportional-integral-derivative (PID) control, etc.

In some embodiments, the first distributed controller 550 can be configured to output a result of the first control operation. For example, the output processing module 614 can output a result of the first control operation. In some embodiments, the output can be a control signal generated from the first control operation, and the processing circuit 604 can use the control signal to control the edge device 630. Continuing with the above example where the edge device 630 is or includes an actuator for dampers, the output processing module 614 can output the control signal to the actuator which controls or adjusts the damper positions of the dampers based on the control signal.

In some embodiments, the output of the first control operation of the first distributed controller can be used by a second distributed controller. In some embodiments, a second distributed controller 552 can receive a second task for performing the control of the control application assigned from the coordinating device 502. In some embodiments, the second distributed controller 552 can also receive or obtain a result of the first control operation from the first distributed controller 550 via wired (e.g., Ethernet) or wireless (e.g., Wi-Fi, Bluetooth, ZigBee, NFC) technologies and protocols. For example, the second control operation of the second distributed controller may depend on the result of the first control operation of the first distributed controller, in some embodiments. As an example, a first distributed controller may generate a first control signal by performing a first control operation of a control application. The first distributed controller then uses the first control signal to control or command one or more sensors (e.g., in its edge device 630) to measure a plurality of sensor readings. After the sensor readings are measured or obtained, the first distributed controller may output the sensor readings as an output signal via its communications interface 620. The second distributed controller can receive or obtain the output signal (e.g., sensor readings) from the first distributed controller, and can perform a second control operation of the control application using the output signal from the first distributed controller. For example, the second distributed controller may perform the second control operation using one or more of the sensor readings to generate a second control signal to control the edge device 630 (e.g., a fan and/or valve) of the second distributed controller. In some embodiments, the second distributed controller can output a result of the second control operation, for example, to perform the next step of the control application.

Figure 9:
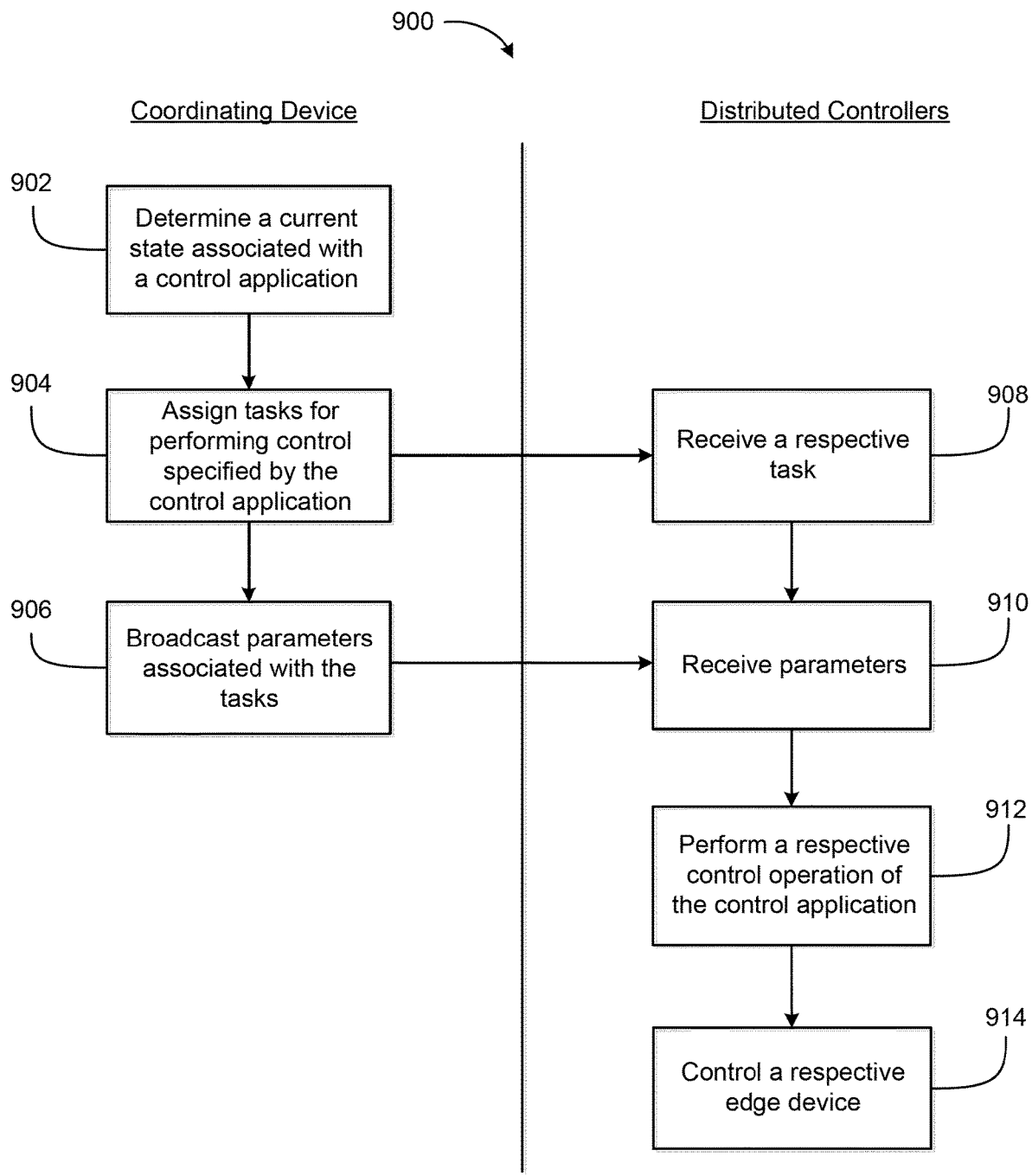
FIG. 9 is a flow diagram of a process for distributed controls via edge devices, according to an exemplary embodiment.

Referring now to FIG. 9, a flow diagram of a process 900 for distributed controls via edge devices is shown, according to an exemplary embodiment. FIG. 9 is shown to include a coordinating device (e.g., coordinating device 502) and one or more distributed controllers (e.g., controllers 550, 552, . . . , 560) configured to perform respective portions of the process 900. The process 900 can include determining a current state associated with a control application based at least in part on one or more current operating modes (block 902). For example, the coordinating device 502 can be configured to determine the current state. For instance, for a control application that controls temperature, the operating modes may include a heating mode, a cooling mode, an occupied mode, and/or an unoccupied mode. In some embodiments, operating modes can be based on inputs from users, sensor readings, and/or other methods. The coordinating device 502 can determine the current state based on the operating modes. For example, if the current operating modes are heating and occupied, the coordinating device 502 can determine that the current state is occupied heating.

The process 900 can include assigning a plurality of tasks for performing control specified by the control application to the plurality of distributed controllers based on the determined current state (block 904). For example, the coordinating device 502 can be configured to assign tasks to the plurality of distributed controllers. Each of the plurality of distributed controllers can be assigned a respective task of the plurality of tasks. In some embodiments, the coordinating device 502 can determine which task to assign to which distributed controller among a plurality of distributed controllers that are loaded with the same control application based on the current state. For example, if the current state is a heating state, the coordinating device 502 assigns the tasks of performing the heating operation to the distributed controllers.

In some embodiments, the coordinating device 502 can maintain information of the distributed controllers in the system 500. For example, information of each distributed controller maintained by the controller management module 510 can include information of the control application loaded on each distributed controller, the edge device integrated within each distributed controller, the location of each distributed controller, and/or the IP address of each distributed controller, etc. In some embodiments, the tasks are assigned based on the edge devices integrated in the distributed controllers. For example, if the edge device integrated in a first distributed controller is an actuator for a valve, the coordinating device 502 assigns the task of controlling the valve to the first distributed controller. Continuing with this example, if the edge device integrated in a second distributed controller includes one or more sensors, the coordinating device 502 assigns the task of measuring variables (e.g., temperature, humidity) to obtain sensor readings to the second distributed controller.

The process 900 can include broadcasting a plurality of parameters associated with the plurality of tasks (block 906). For example, the coordinating device 502 can be configured to broadcast a plurality of parameters. In some embodiments, the coordinating device 502 can maintain a respective list of parameters for performing the control of each control application associated with the BAS. For example, for a temperature control application, the list of parameters can include one or more setpoints for each state associated with the temperature control application. The values of the parameters can be set by users and/or set by the system. For example, a user may set the temperature setpoint for the occupied cooling state to be 65° F. and the temperature setpoint for the occupied heating state to be 70° F. For instance, the system may default/reset the temperature setpoint for the unoccupied cooling state to be 85° F. and the temperature setpoint for the unoccupied heating state to be 60° F.

The process 900 can include receiving a respective task for performing the control specified by the control application from the coordinating device (block 908). For example, a first distributed controller 550 can receive a first task for performing the control specified by the control application, and a second distributed controller 552 can receive a second task for performing the control specified by the same control application. The tasks can be received via wired or wireless connections from the coordinating device. In some embodiments, each distributed controller can determine which control operation of the control application to perform based on the respective task assigned to it. For example, the distributed controller 550 may determine to perform the operation of sensor readings based on the task assigned to the distributed controller 550, and the distributed controller 552 may determine to perform the operation of controlling dampers based on the task assigned to the distributed controller 552.

The process 900 can include receiving the parameters associated with the plurality of tasks from the coordinating device (block 910). For example, each distributed controller 550, 552, . . . , 560 can receive parameters broadcasted by the coordinating device 502 and can determine which parameters to use based on the task assigned to the distributed controller. For example, if the distributed controller 550 determines that the control operation for it to perform requires temperature setpoints, the distributed controller 550 can store the temperature setpoints parameters received from the coordinating device in its memory and use the temperature setpoints for performing the control operation.

The process 900 can include performing a respective control operation of the control application (block 912). For example, a first distributed controller 550 can perform a first control operation of the control application, and a second distributed controller 552 can perform a second control operation of the control application. For example, if the control operation performed by the distributed controller 550 is to control its edge device 630 which is an actuator for dampers, the distributed controller 550 can compare the temperature setpoint parameter received from the coordinating device with the current temperature measured by a sensor. Based on the comparison, the distributed controller 550 can generate a control signal for controlling the actuator to adjust the damper positions to bring the current temperature to the setpoint. In some embodiments, the distributed controller 550 can be configured to perform the first control operation using control techniques such as proportional-integral (PI) control, proportional-integral-derivative (PID) control, etc.

The process 900 can include controlling a respective edge device using a control signal generated from a respective control operation (block 914). For example, a first distributed controller 550 can control a first edge device using a control signal generated from a first control operation, and a second distributed controller 552 can control a second edge device using a control signal generated from a second control operation. For example, if the edge device of the distributed controller 550 is an actuator to control dampers, the distributed controller 550 can use the control signal generated from the control operation performed by the distributed controller 550 at block 912 to adjust the damper positions. If the edge device of the distributed controller 552 is an actuator to control valves, the distributed controller 552 can use the control signal generated from the control operation performed by the distributed controller 552 at block 912 to control the valves.

Figure 10:
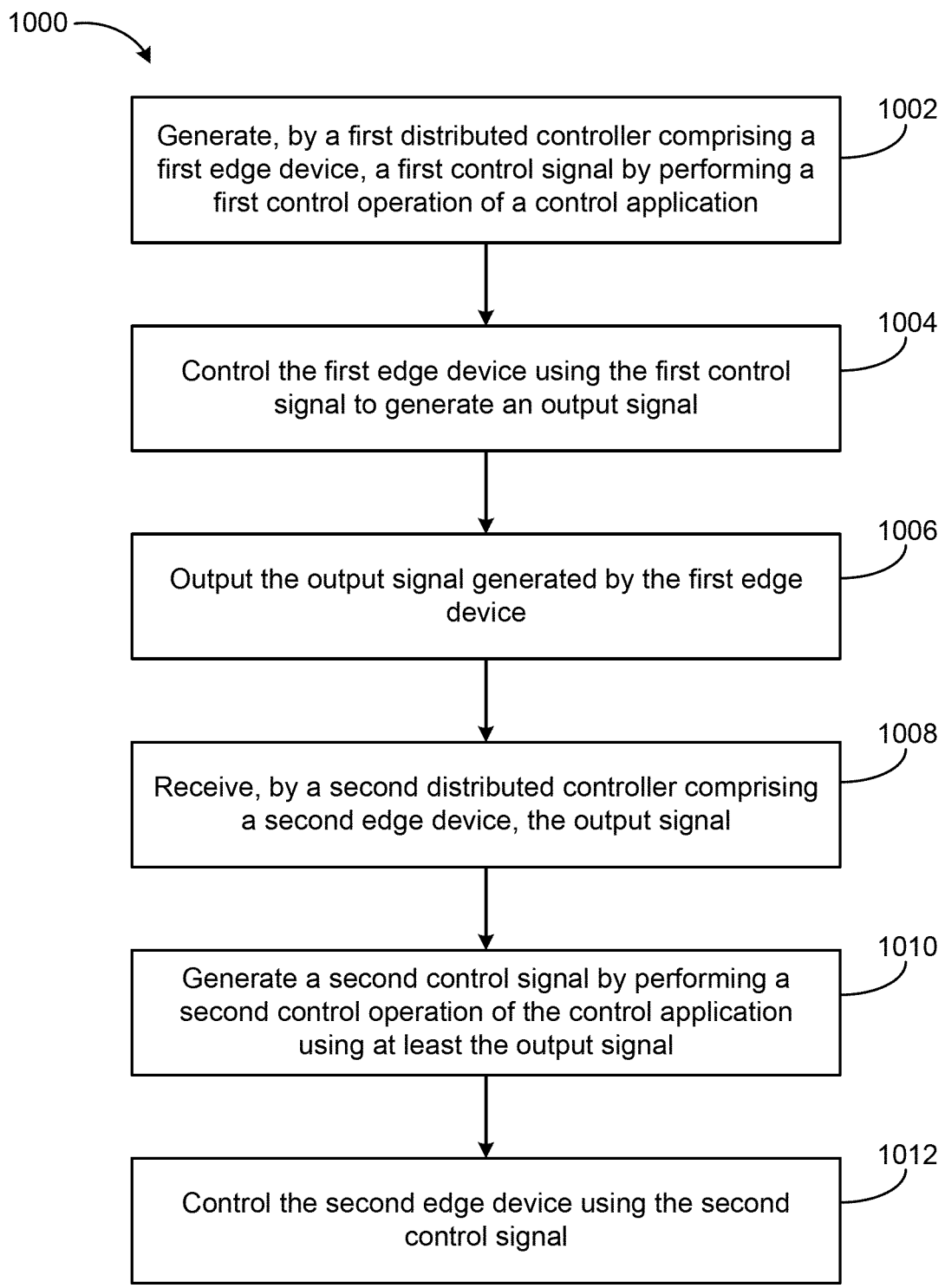
FIG. 10 is a flow diagram of a process for distributed controls via edge devices, according to an exemplary embodiment.

Referring now to FIG. 10, a flow diagram of a process 1000 for distributed controls via edge devices is shown, according to an exemplary embodiment. The process 1000 can be performed by a plurality of distributed controllers (e.g., controllers 550, 552, . . . , 560) that can communicate with each other using wired (e.g., Ethernet) or wireless (e.g., Wi-Fi, Bluetooth, ZigBee, NFC) technologies and protocols. The process 1000 can include generating a first control signal by performing a first control operation of a control application (block 1002). For example, a first distributed controller 550 can generate a first control signal by performing a first control operation of a control application. In some embodiments, the first distributed controller can include a processor, a memory, and an edge device which includes at least one of an actuator, a valve, a thermostat, a sensor, a damper, or an air handling unit. For example, the processor, and the memory, and the edge device of the first distributed controller 550 can be integrated within a same housing or chassis. In some embodiments, the first distributed controller can decide which control operation or which portion of the control application it performs based on the specifics of the I/O that is connected to it (e.g., count as well as what particular edge device and controls are connected). For example, the first distributed controller can be loaded with a single piece of control logic or control application, and based on the configuration of the I/O, the first distributed controller can determine which portion of the control logic or control application is to be executed and what points of data are to be made available to another distributed controller. In some embodiments, after the first distributed controller is installed, a user or the first distributed controller itself can download (e.g., manually or automatically) the appropriate control application (or sub-application) that the first distributed controller is supposed to (or configured to, planned to) run or execute based on the configuration of the I/O.

In some embodiments, the first distributed controller can perform the first control operation using parameters received from other devices (e.g., another distributed controller, a coordinating device). In other embodiments, the parameters can be entered by a user, such as a site manager, a field engineer/technician, an occupant, etc. For example, a user can input configuration data (e.g., I/O, network settings, control settings, account settings, etc.) manually via HTML or mobile applications. In some embodiments, all communications can be via Hypertext Transfer Protocol Secure (HTTPS). In some embodiments, a control signal can be generated as a result of the first control operation. For example, a control signal for controlling one or more sensors to measure variables such as temperature, humidity, pressure, etc. can be generated as a result of the first control operation performed by the first distributed controller 550.

The process 1000 can include controlling the first edge device to generate an output signal using the first control signal generated from the first control operation of the control application (block 1004). For example, the first distributed controller 550 can control the edge device 630 of the distributed controller 550 to generate an output signal. Continuing with the example of block 1002, the first distributed controller 550 can control sensors using the control signal to generate sensor readings as the output signal. The process 1000 can include outputting the output signal generated by the first edge device (block 1006). Continuing with the above example, the first distributed controller 550 can output the sensor readings generated by the sensors via the communications interface 620 of the first distributed controller 550. In some embodiments, the output signal is broadcasted by the first distributed controller so that all other distributed controllers configured to perform the control specified by the same control application can receive the output signal. In other embodiments, the output signal is transmitted from the first distributed controller to another distributed controller that is configured to perform the next step of the control of the control application.

The process 1000 can include receiving the output signal from the first distributed controller (block 1008). For example, a second distributed controller 552 can receive the output signal from the first distributed controller 550. In some embodiments, the second distributed controller can include a processor, a memory, and an edge device which includes at least one of an actuator, a valve, a thermostat, a sensor, a damper, or an air handling unit. For example, the processor, and the memory, and the edge device of the second distributed controller 552 can be integrated within a same housing or chassis. In some embodiments, the second distributed controller 552 can receive the output signal through the communications interface 620 of the second distributed controller 552 via wired or wireless connections.

The process 1000 can include generating a second control signal by performing a second control operation of the control application using at least the output signal from the first distributed controller (block 1010). Continuing with above example, the second distributed controller 552 can perform the second control operation using the sensor readings received from the first distributed controller 550 to generate a second control signal for controlling its edge device. The process 1000 can include controlling the second edge device using the second control signal generated from the second control operation of the control application (block 1012). For example, the second distributed controller 552 can control its edge device 630 which is an actuator for dampers using the second control signal to adjust the damper positions.

Configuration of Exemplary Embodiments

The construction and arrangement of the systems and methods as shown in the various exemplary embodiments are illustrative only. Although only a few embodiments have been described in detail in this disclosure, many modifications are possible. For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system comprising:
   a plurality of distributed controllers configured to perform control specified by a control application; and
   a coordinating device configured to:
      determine a current state associated with the control application based at least in part on one or more current operating modes;
      assign a plurality of tasks for performing the control specified by the control application to the plurality of distributed controllers based at least in part on the determined current state, wherein each of the plurality of distributed controllers is assigned a respective task of the plurality of tasks; and
      transmit a plurality of parameters associated with the plurality of tasks;
   wherein a first distributed controller among the plurality of distributed controllers is configured to:
      receive a first task for performing the control specified by the control application assigned from the coordinating device;
      perform a first control operation corresponding to the first task using at least one or more of the plurality of parameters received from the coordinating device; and
      output a result of the first control operation.

2. The system of claim 1, wherein a second distributed controller among the plurality of distributed controllers is configured to:
   receive a second task for performing the control specified by the control application assigned from the coordinating device;
   receive or obtain the result of the first control operation from the first distributed controller;
   perform a second control operation corresponding to the second task using at least the result of the first operation from the first distributed controller; and
   output a result of the second control operation.

3. The system of claim 1, wherein each of the distributed controllers is integrated with a respective edge device.

4. The system of claim 3, wherein the respective edge device comprises at least one of an actuator, a valve, a thermostat, a sensor, a damper, or an air handling unit.

5. The system of claim 3, wherein the plurality of tasks for performing the control specified by the control application are assigned further based on the edge device integrated in each distributed controller.

6. The system of claim 1, wherein the first distributed controller is integrated with an actuator comprising a motor and a drive device.

7. The system of claim 1, wherein the result of the first control operation is a control signal generated from the first control operation, and the first distributed controller is configured to control a HAVC equipment using the generated control signal.

8. The system of claim 1, wherein the result of the first control operation is a control signal generated from the first control operation, and wherein the first distributed controller is integrated with an actuator configured to use the control signal to control a valve, a damper, or an air handing unit.

9. The system of claim 1, wherein each of the plurality of distributed controllers is configured to perform a respective portion of the control specified by the control application.

10. The system of claim 1, wherein the plurality of distributed controllers are configured to communicate with each other wirelessly using one or more wireless protocols or via wired connections.

11. The system of claim 1, wherein the one or more current operating modes comprise at least one of a heating mode, a cooling mode, an occupied mode, or an unoccupied mode.

12. A system comprising:
a first distributed controller comprising:
   a first edge device comprising at least one of an actuator, a valve, a thermostat, a sensor, a damper, or an air handling unit;
   a first processor; and
   a first memory coupled to the first processor, the first memory storing computer-executable instructions, which when executed by the first processor, cause the first processor to:
      generate a first control signal by performing a first control operation of a control application;
      control the first edge device to generate an output signal using the first control signal generated from the first control operation of the control application; and
      output the output signal generated by the first edge device, and
a second distributed controller comprising:
   a second edge device comprising at least one of an actuator, a valve, a thermostat, a sensor, a damper, or an air handling unit;
   a second processor; and
   a second memory coupled to the second processor, the second memory storing computer-executable instructions, which when executed by the second processor, cause the second processor to:
      receive the output signal from the first distributed controller;
      generate a second control signal by performing a second control operation of the control application using at least the output signal from the first distributed controller; and
      control the second edge device using the second control signal generated from the second control operation of the control application.

13. The system of claim 12, wherein the first edge device, the first processor, and the first memory are integrated within a first housing of the first distributed controller, and the second edge device, the second processor, and the second memory are integrated within a second housing of the second distributed controller.

14. The system of claim 12, wherein the second distributed controller receives the output signal from the first distributed controller wirelessly over a wireless protocol or via a wired connection.

15. A method comprising:
determining, by a coordinating device comprising a processor and a memory, a current state associated with a control application based at least in part on one or more current operating modes;
assigning, by the coordinating device, a plurality of tasks for performing control specified by the control application to a plurality of distributed controllers based at least in part on the determined current state, wherein each of the plurality of distributed controllers is assigned a respective task of the plurality of tasks; and
broadcasting, by the coordinating device, a plurality of parameters associated with the plurality of tasks, wherein each of the plurality of distributed controllers is configured to perform a respective portion of the control specified by the control application using one or more of the plurality of parameters broadcasted from the coordinating device.

16. The method of claim 15, further comprising:
receiving, by a distributed controller among the plurality of distributed controllers, a first task for performing the control specified by the control application assigned from the coordinating device;
performing, by the distributed controller, a first control operation corresponding to the first task using at least one or more of the plurality of parameters received from the coordinating device; and
controlling, by the distributed controller, an edge device using a control signal generated from the first control operation.

17. The method of claim 15, wherein each of the distributed controllers is integrated with a respective edge device.

18. The method of claim 17, wherein the plurality of tasks for performing the control specified by the control application are assigned further based on the edge device integrated within each distributed controller.

19. The method of claim 15, wherein the plurality of distributed controllers communicate with each other via at least one of wired or wireless connections.

20. The method of claim 15, wherein the one or more current operating modes comprise at least one of a heating mode, a cooling mode, an occupied mode, or an unoccupied mode.

* * * * *